(12) United States Patent
Brooks (10) Patent No.: US 11,613,150 B2
(45) Date of Patent: Mar. 28, 2023

(54) VEHICLE SUSPENSION SYSTEM

(71) Applicant: Dana Heavy Vehicle Systems Group, LLC, Maumee, OH (US)

(72) Inventor: Dustin Brooks, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/451,075

(22) Filed: Oct. 15, 2021

(65) Prior Publication Data
US 2022/0144032 A1  May 12, 2022

Related U.S. Application Data

(60) Provisional application No. 63/113,086, filed on Nov. 12, 2020.

(51) Int. Cl.
*B60G 9/02* (2006.01)
*B60G 11/04* (2006.01)

(52) U.S. Cl.
CPC .............. *B60G 9/027* (2013.01); *B60G 11/04* (2013.01); *B60G 2200/324* (2013.01); *B60G 2202/112* (2013.01); *B60G 2204/121* (2013.01); *B60G 2204/19* (2013.01); *B60G 2300/50* (2013.01)

(58) Field of Classification Search
CPC .... B60G 9/027; B60G 11/04; B60G 2200/32; B60G 2200/324; B60G 2200/422; B60G 2202/112; B60G 2204/121; B60G 2204/18; B60G 2204/19; B60G 2300/50
See application file for complete search history.

(56) References Cited

U.S. PATENT DOCUMENTS

| | | | | |
|---|---|---|---|---|
| 6,139,092 A | * | 10/2000 | Doner | B62D 21/152 293/138 |
| 2012/0200057 A1 | * | 8/2012 | Juriga | B60G 11/06 280/124.116 |
| 2015/0366125 A1 | * | 12/2015 | Cross | B60G 7/04 172/3 |
| 2020/0346506 A1 | | 11/2020 | Laforce et al. | |

FOREIGN PATENT DOCUMENTS

| | | | | |
|---|---|---|---|---|
| CN | 105764718 B | * | 1/2018 | ........... B60B 35/005 |
| DE | 102019204567 A1 | * | 10/2020 | ............ B60G 11/04 |
| EP | 3698998 A1 | * | 8/2020 | ............ B60G 11/04 |
| WO | WO-2019003926 A1 | * | 1/2019 | ............ B60G 11/04 |
| WO | 2019046531 A1 | | 3/2019 | |

* cited by examiner

*Primary Examiner* — Laura Freedman
*Assistant Examiner* — Daniel M. Keck
(74) *Attorney, Agent, or Firm* — McCoy Russell LLP (57) ABSTRACT

A suspension system in a vehicle is provided. The suspension system includes, in one example, a hub carrier mounting structure and a hub carrier designed to couple to a wheel hub. The hub carrier mounting structure includes a mounting flange removably attached to the hub carrier and an upper case and a lower case coupled to a support beam, the upper and lower cases are coupled via a first set of attachment devices and a second set of attachment devices that are positioned on opposing sides of the upper and lower cases, where the first and second sets of attachment devices have varying vertical heights.

18 Claims, 3 Drawing Sheets

VEHICLE SUSPENSION SYSTEM

CROSS REFERENCE TO RELATED APPLICATION

The present application claims priority to U.S. Provisional Application No. 63/113,086, entitled "VEHICLE SUSPENSION SYSTEM", and filed on Nov. 12, 2020. The entire contents of the above-listed application are hereby incorporated by reference for all purposes.

TECHNICAL FIELD

The present description relates to a vehicle suspension system. More particularly, the present description relates to a wheel hub carrier assembly in a suspension system.

BACKGROUND AND SUMMARY

Vehicles have deployed non-independent suspension systems, such as de Dion beam systems, to achieve handling performance and ride quality targets. De Dion suspension platforms blend performance characteristics from fully independent and beam axle suspension arrangements. For instance, de Dion suspension systems have certain camber characteristics of beam axle suspension systems and some of the wheel alignment characteristics of independent suspension systems. De Dion suspension systems typically include a beam extending between opposing wheel hub carriers to achieve these characteristics.

US 2020/0346506 A1 to LaForce et al. discloses an electric axle drivetrain with a de Dion type suspension architecture. The drivetrain assembly includes a differential receiving rotational input from an electric motor. This drivetrain, as well as other drivetrains, have presented issues with regard to packaging and component assembly. For instance, the drivetrain disclosed in US 2020/0346506 A1 may pose impediments to axle shaft installation at certain stages in the manufacture of certain axle arrangements. Other hub carrier assemblies have included carrier sections that may accommodate for axle shaft installation, at the expense of decreased space efficiency and increased weight.

The inventor has recognized the challenges presented by previous suspension systems and developed a suspension system to at least partially overcome at least a portion of these challenges. The suspension system includes a hub carrier mounting structure and a hub carrier designed to couple to a wheel hub. The hub carrier mounting structure includes a mounting flange that is removably attached to the hub carrier. The hub carrier mounting structure further includes an upper case and a lower case coupled to a support beam. Further, in the suspension system, the upper and lower cases are coupled via a first set of attachment devices and a second set of attachment devices. The first and second sets of attachment devices are positioned on opposing sides of the upper and lower cases. Additionally, in the suspension system, the first and second set of attachment devices have varying vertical heights. In this way, the suspension system forms a space efficient package which may simplify axle shaft installation, in certain manufacturing sequences.

Further in one example, the upper case may include a sidewall extending below an aperture designed to receive an axle shaft. Profiling the upper case in this manner enable the axle shaft to be more efficiently installed when the suspension system is incorporated into a vehicle.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-5 are drawn approximately to scale. However, other relative component dimensions may be used, in other embodiments.

DETAILED DESCRIPTION

An electric axle suspension system with a hub carrier assembly which achieves increased space efficiency and ease of assembly is described herein. Said compact structure conserves valuable space within the vehicle and imposes fewer space constraints on other axle and suspension components. The hub carrier may be designed with reinforcements which enable the carrier's profile to be reduced without significantly impacting the assembly's strength, and more generally allow the assembly's strength to weight ratio to be increased, if desired.

Figure 1:
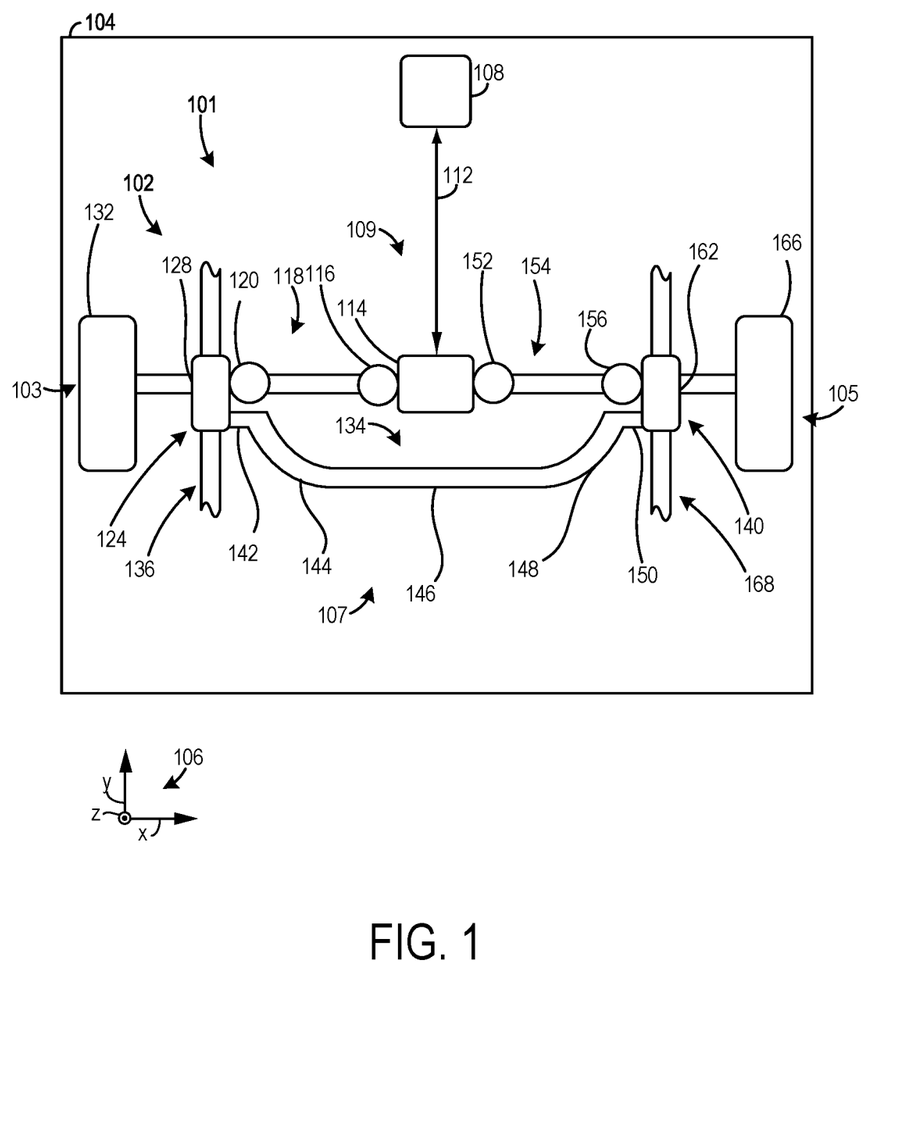
FIG. 1 is an illustration of a vehicle including an electric axle assembly.

FIG. 1 shows an embodiment of a suspension system 101 (e.g., a de Dion suspension system) for an axle assembly 102 (e.g., an electric axle assembly) of a vehicle 104. The vehicle 104 may be an electric vehicle (EV) such as a battery electric vehicle (BEV), in one example, or a hybrid electric vehicle (HEV), in another example. The vehicle 104 may be a light, medium, or heavy duty vehicle, such as a passenger vehicle, a commercial truck, a bus, a vocational vehicle, and the like. To aid in clarity, FIG. 1 additionally depicts an axis system 106 relating to the orientations of vehicle components. The axis system 106 includes an x-axis extending laterally, a y-axis extending longitudinally and perpendicular to the x-axis, and a z-axis extending vertically, perpendicular to the x and y axes. Distances along the z-axis or axes parallel to the z-axis may denote a component's vertical height. However, the axes may have alternate orientations, in other embodiments. The axis system 106 is additionally depicted in FIGS. 2-5, for reference.

As a nonlimiting example, the axle assembly 102 may include or receive mechanical power from an electric machine 108 (e.g., electric motor-generator) that may be coupled (e.g., rotationally coupled) to a differential 114. The differential 114 is designed to allow for speed differentiation between drive wheels. Arrow 112 indicates the flow of power from the electric machine 108 to the differential 114. In a drive mode, the electric axle power path may begin at the electric machine 108 and then may pass through drivetrain components such as a transmission or gearbox incorporated into the axle, drive shafts, joints, and the like.

The differential 114 may be connected (e.g., rotationally coupled) to a joint 116. In some embodiments, the first axle shaft 118 may extend parallel to the x-axis, although other configurations and placements are considered. In the illustrated embodiment, the joint 116 may be on a lateral side 103 of the electric axle assembly 102 (e.g., on a left side of the differential 114), although other configurations and designs remain within the scope of this disclosure. The first axle shaft 118 may be connected (e.g., rotationally coupled) to a joint 120. The joint 120 may be connected to a first wheel assembly 132, transmitting torque thereto. Further, the joints 116 and 120, and the other joints described herein, may be included in the suspension system 101, which may further include conventional components such as shocks, dampers, mounting structures, and the like.

The joints 116 and 120 may provide points of articulation in the system's mechanical power path. These points of articulation may allow the wheels to move independently and achieve increased traction, for example, while transmitting torque to the wheels and maintaining desired ride quality of the vehicle's sprung portion (e.g., the chassis), if wanted. The joints 116 and 120 may therefore increase vehicle handling performance.

The first hub carrier assembly 124 may include a first hub carrier aperture 128, through which a distal end of the first axle shaft 118 may be inserted. The first hub carrier assembly 124 may be coupled to a support beam 134 (e.g., a de Dion beam) and a first spring 136 (e.g., leaf spring, coil spring, air spring, combinations thereof, and the like). More specifically, the support beam 134 may include a first end portion 142, which may be coupled to the first hub carrier assembly 124. Further, the first end portion 142 of the support beam 134 may extend laterally, parallel to the first axle shaft 118, although other configurations and positions are considered. In one embodiment, the first spring 136 may be placed below the first hub carrier assembly 124 in relation to the z-axis. However, in other embodiments, the first spring 136 may be arranged above the first hub carrier assembly 124.

The support beam 134 may extend towards a lateral side 105 of the axle assembly 102, opposite from the lateral side 103 where the first hub carrier assembly 124 is located, and join with a second hub carrier assembly 140. The support beam 134 may be a hollow or solid cylinder, in one embodiment, although other shapes are possible. A front side 107 and a rear side 109 of the axle assembly 102 are also provided in FIG. 1, for reference.

Additionally, the support beam 134 may include a first curved portion 144, which may extend at an angle from the first end portion 142. The first curved portion 144 may extend longitudinally away from the first axle shaft and laterally towards the differential. The first curved portion 144 may join to an intermediate portion 146 of the support beam 134, which may extend parallel to the first end portion 142 and to the axle shaft 118, at an offset distance, although other configurations are considered.

The intermediate portion 146 may join a second curved portion 148. The second curved portion 148 may extend at an angle from the intermediate portion 146 such that the second curved portion extends from the intermediate portion laterally away from the differential, and longitudinally towards a second axle shaft 154. The second curved portion 148 may join a second end portion 150, which may be parallel to the first end portion 142, the intermediate portion 146, and the first axle shaft 118, although other spatial relationships have been considered. For instance, the support beam 134 may have a substantially lateral orientation (e.g., parallel to a rotational axis of the axle).

The lateral side 105 of the axle assembly may have a configuration similar to the lateral side 103 of the electric axle assembly, but mirrored about the y-axis. For example, the differential 114 may be coupled to a joint 152. The second axle shaft 154 may be coupled to the joint 152. In some embodiments, the second axle shaft 154 may extend parallel to the x-axis, although other configurations and placements are considered. In the embodiment illustrated, the joint 152 is adjacent to the differential 114, although other configurations and designs remain within the scope of this disclosure. The second axle shaft 154 may be connected to a joint 156. The joint 156 may be coupled to a second wheel assembly 166, transmitting torque thereto. The joints 116, 120, 152, and 156 may be universal joints, double universal joints, constant velocity joints, and the like.

The second hub carrier assembly 140 may include a second hub carrier aperture 162, through which a distal end of the second axle shaft 154 may be inserted. Specifically, the distal end of the second axle shaft 154 may be coupled to the second wheel assembly 166.

The second spring 168 may be coupled to the support beam 134 at an opposite lateral side from the first location of coupling the first end of the support beam to the first spring 136 (e.g., on the lateral side 105 of the electric axle assembly 102). Similar to the coupling of the first spring 136, the second spring 168 may be coupled to the second hub carrier assembly 140. More specifically, the second spring 168 may be positioned vertically below the support beam 134, in an underslung position. However, other configurations, such as an overslung position, in which the second spring 168 may be positioned vertically above the support beam 134, have been envisioned. Additionally, embodiments in which the second spring is attached directly to the support beam, in either an overslung or underslung position, have been contemplated.

At least a portion of the second spring 168 may be coupled to a chassis or other suitable component of the vehicle 104. The second spring 168 may act together with the first spring 136 to allow the sprung portion of the vehicle 104 to move with respect to the position of the unsprung portion of the vehicle 104.

As stated previously, the first hub carrier assembly 124 may be coupled to the first spring 136. Similarly, the second hub carrier assembly 140 may be coupled to a second spring 168. The springs may be leaf springs, coil springs, air springs, combinations thereof, etc. The second spring 168 may be placed below the second hub carrier assembly 140 in relation to the z-axis. In one example, the first and second springs 136 and 168 may be positioned vertically below the support beam 134, in an underslung position. However, other configurations, such as an overslung position, in which the first and second springs 136 and 168 may be positioned vertically above the support beam 134, have been considered. Additionally, embodiments in which the leaf spring is attached directly to the support beam, in either an overslung or underslung position, have been considered.

At least a portion of the first and second springs 136 and 168 may be coupled to at least a portion of the vehicle 104, which may be, for instance, a chassis. The flexion of the first and second springs 136 and 168 may allow the portion of the vehicle 104 which is supported by the first and second springs 136 and 168 to move relative to the electric axle assembly 102 and other unsprung parts.

The support beam 134 may provide structural support to the suspension system 101. To elaborate, the support beam 134 provides a substantially rigid support, which may allow the camber of both the first wheel assembly 132 and the second wheel assembly 166 to be substantially fixed. The first wheel assembly 132 may include a wheel, wheel hub, etc. Similarly, the second wheel assembly 166 may include a wheel, wheel hub, etc. at an opposite lateral side from the first wheel assembly 132.

The first and second springs 136 and 168, along with the differential 114, and the joints 116, 120, 152, and 156, respectively, may each provide points of articulation in the suspension system 101. The suspension system 101 may therefore support the vehicle load and allow the chassis to remain in a desired positon, while the unsprung portion of the vehicle 104 moves in response to irregularities, grade changes, or elevation changes between and among wheels on the same axle and wheels on different axles.

A control system with a controller may be included in the electric axle assembly 102. The controller system may be designed to send command signals to controllable components such as the electric machine 108, the differential (if an electronic locking differential is deployed), and the like.

Figure 2:
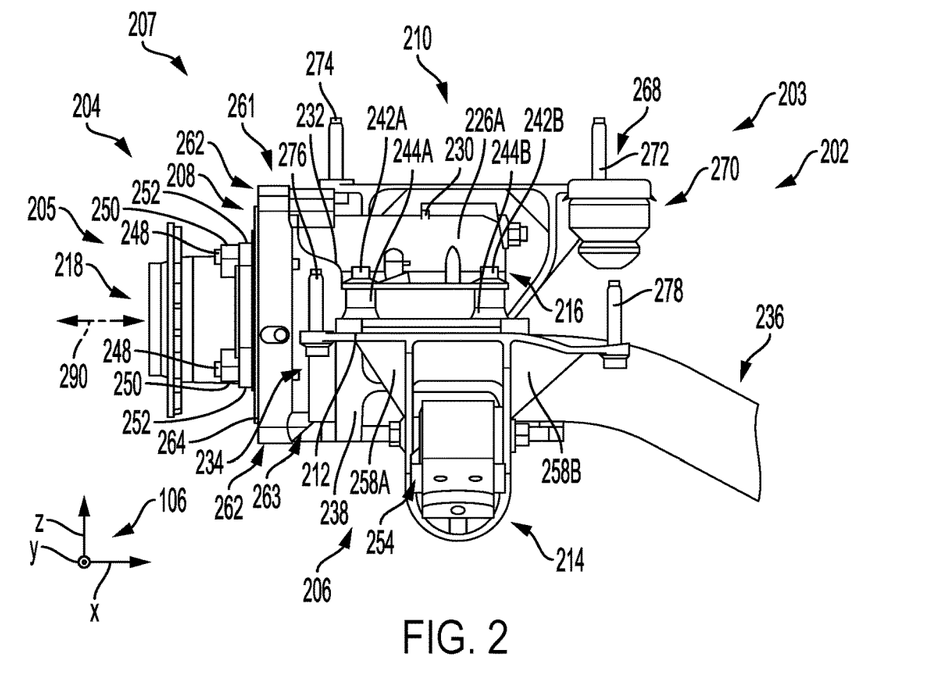
FIG. 2 is a front view of an embodiment of an electric axle assembly.

FIG. 2 shows an electric axle assembly 202 with a suspension system 203. The electric axle assembly 202 and suspension system 203 may be an example of the electric axle assembly 102 and suspension system 101, shown in FIG. 1. Thus, the axle assembly 202 may be included in the vehicle 104, in one example.

In FIG. 2, a hub carrier assembly 204 is shown. The hub carrier assembly 204 may couple to an axle shaft and joint, such as the first axle shaft 118 and the joint 120, previously depicted in FIG. 1. These components however are removed to more clearly show the features of the hub carrier assembly 204.

As illustrated in FIG. 2, the hub carrier assembly 204 may include multiple detachably coupled portions: a hub carrier 205; and a hub carrier mounting structure 207. The hub carrier mounting structure 207 may include a lower case 206, a mounting flange 208, and an upper case 210. The hub carrier 205 is profiled to receive a wheel hub in a wheel assembly. The detachability of the carrier components may allow for more efficient manufacturing, while following certain manufacturing guidelines relating to the order in which electric axle drivetrain components are installed, in some use-case scenarios. Specifically, the current embodiment may allow for the efficient insertion of axle shafts (e.g., the axle shafts 118 and 154 shown in FIG. 1) into the hub carrier assembly 204.

Additionally, the hub carrier assembly 204 may be manufactured via casting and machining, which may allow for greater precision in the shape and size of components in comparison to manufacturing techniques such as stamping. Consequently, the cast hub carrier assembly may have features with smaller tolerances than stamped features would. Smaller tolerances may allow the vehicle to more closely control wheel alignment, when compared to stamped components. Further, casting and machining the hub carrier assembly may allow the assembly to be formed with contours exhibiting a higher strength to weight ratio when compared to carrier contours formed vis stamping, for instance. Some vehicle manufacturing guidelines may demand installation of the axle shaft (e.g., the axle shaft 118 shown in FIG. 1) into the first wheel assembly prior to assembly of the hub carrier assembly 204. Therefore, the hub carrier assembly may be designed with a lower profile which allows for easier axle assembly.

The lower case 206 may include a lower face 212. The lower face 212 may include the lower portion of the hub carrier assembly 204. A spring attachment component 214 may be coupled to the lower face 212. The spring attachment component 214 may be placed directly below an assembly aperture 216, in one example, although other placements are considered. The assembly aperture 216 is configured to receive an axle shaft when installed in a vehicle. Thus, the axle shaft may be aligned with axis 290.

The lower case 206 of the hub carrier assembly 204 may additionally include a coupling sleeve 238 through which a first end 234 of a support beam 236 may extend. The hub carrier assembly 204 and the first end 234 of the support beam 236 may be removably coupled to one another. Said coupling sleeve 238 may include a hollow portion, formed by a generally annular portion of the lower case 206. The coupling sleeve 238 may secure the support beam 236 in place in relation to the hub carrier assembly 204 and, in the pictured embodiment, may be positioned to the rearward side of the hub carrier assembly, relating to the y-axis, although other placements have been considered.

The spring attachment component 214 may be removably or fixedly coupled to the lower case 206 and may be located directly below the assembly aperture 216, in one embodiment, although other positions are considered. The spring attachment component 214 may be situated vertically and longitudinally offset from the upper case 210. In other words, the spring attachment component 214 may be, in relation to the y and z axes, offset from the support beam 236. The spring attachment component 214 may interface with a spring 254. Said spring may be a leaf spring or other appropriate spring device, such as an air spring, a coil spring, and the like.

Figure 4:
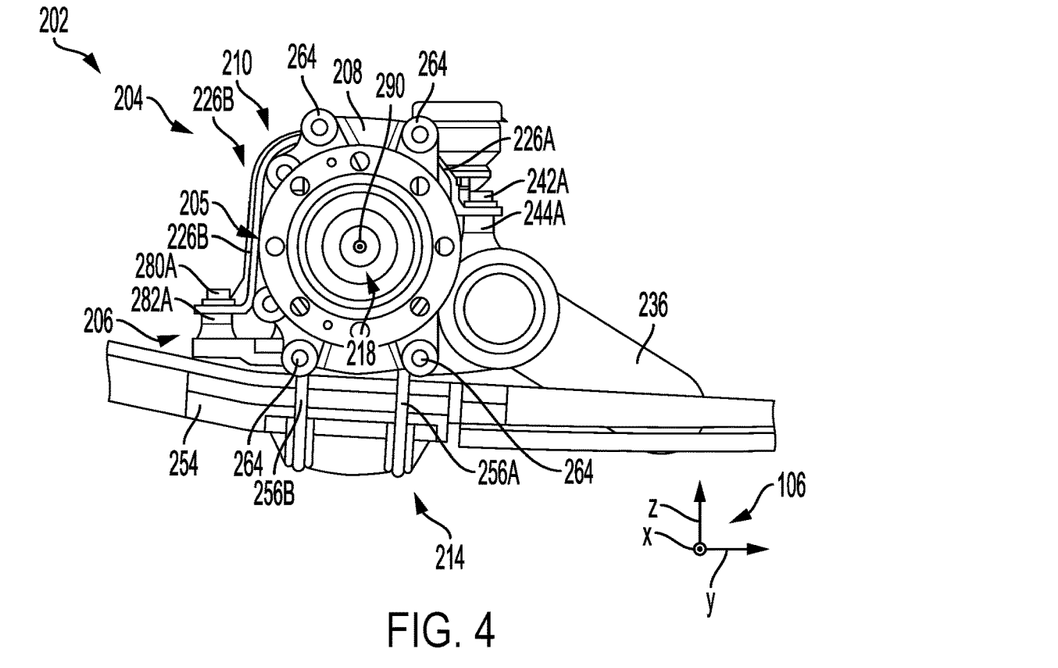
FIG. 4 is a side view of the electric axle assembly, shown in FIG. 2.

The spring attachment component 214 may include a pair of brackets 256A, 256B, as shown in FIG. 4, which may surround a portion of the spring 254. The spring attachment component 214 shown in FIG. 2 may be reinforced by a support member 258A, which may be placed at the intersection of the distal and vertically extending portion of the first bracket 256A and the hub carrier assembly 204. A support member 258B may be placed at the proximal intersection of the first bracket 256A and the hub carrier assembly 204. The second bracket 256B, with similar structure, may be positioned to the forward side of the first bracket 256A, as shown in FIG. 4. Continuing with FIG. 2, the inclusion of the support members 258A, 258B may provide benefits by reinforcing the spring attachment component 214, while reducing the weight of the carrier, if desired. This increased strength to weight ratio may allow gains in suspension and handling performance to be realized.

A central opening 218 laterally extends through the mounting flange 208 and the hub carrier 205 which enables wheel hub and axle shaft attachment. The central opening 218 may define a central axis 290 of the assembly aperture 216. The central axis 290 is further depicted in FIGS. 3-5, for reference. Said central axis 290 may be parallel to the x-axis, although other configurations and positions are considered. The mounting flange 208 may include a series of bores 252, which may be used to attach the hub carrier 205 to the mounting flange. The bores 252 may align with hub carrier bores 250 located on the hub carrier. A series of attachment devices 248 may engage with the bores 252 and 250, to couple the hub carrier to the mounting flange 208. Said attachment devices 248 may be screws, bolts, clamps, brackets, and/or other suitable attachment devices.

The mounting flange 208 may additionally include a series of mounting flange bores 262, which may be hollow tunnels traversing the mounting flange 208. A portion of the mounting flange bores 262 may engage with a series of upper mounting flange bores 261, situated on the upper case 210 and in face-sharing contact with the uppermost mounting flange bores 262. A portion of the mounting flange bores 262 may be in face sharing contact with a series of lower mounting flange bores 263. A series of mounting flange attachment devices 264 may engage with the bores 261, 263, securing the components of the carrier in place. Said attachment devices 264 may be screws, bolts, clamps, brackets, or other appropriate attachment devices.

The mounting flange bores 262 may have a relatively low profile along the mounting flange 208. The mounting flange bores 262 may be positioned radially near to the central axis 290 of the assembly aperture 216, in one embodiment, although other positions are considered. The low profile of the mounting flange 208 may allow for efficient attachment between the mounting flange 208, the lower case 206, and the upper case 210, during manufacturing. This space efficiency may further allow the other components of the vehicle to be moved inward toward the axle assembly, if wanted. By reducing the profile of the carrier assembly, the assembly's weight may be reduced, thereby reducing the suspension system's unsprung weight.

The upper case 210 may partially surround a portion of the axle shaft when the system in installed in a vehicle. The lower portion of the upper case 210 may include a curved recess through which the axle shaft slots. The upper case 210 may additionally include a first upper case sidewall 226A and a second upper case sidewall 226B, more clearly seen in FIGS. 3 and 5. The first upper case sidewall 226A may form a generally flat lateral face (e.g., a plane parallel to the z and x-axes), extending between a first set of attachment sleeves 244A, 244B.

The hub carrier assembly 204 may be held securely by the engagement of the lower and upper cases 206 and 210. Inserted into the first set of attachment sleeves 244A, 244B (e.g., upper set of attachment sleeves) may be a first set of attachment devices 242A, 242B. The first set of attachment devices 242A, 242B may be screws, bolts, or other appropriate fasteners. Thus, the attachment devices 242A, 242B as well as the attachment devics well as the attachment devices 280A, 280B (shown in FIG. 3 and described in greater detail herein) may permit the removable attachment between the upper case 210 and the lower case 206. Continuing with FIG. 2, each device in the first set of attachment devices 242A, 242B and their associated attachment sleeves 244A, 244B may be separated by a distance along the x-axis.

The first set of attachment sleeves 244A, 244B may include a pair of hollow cylinders which may share a face with the first upper case sidewall 226A. The first set of attachment sleeves 244A, 244B may extend vertically upward along the z-axis, and extend longitudinally outward from the first upper case sidewall 226A of the hub carrier assembly 204. The first upper case sidewall 226A may be positioned more forward (along a longitudinal axis) than the rear side of the attachment sleeve 244A, such that the middle portion of the first upper case sidewall 226A may not extend past the attachment sleeve 244A. In this way, the first set of attachment sleeves 244A, 244B may secure the first set of attachment devices 242A, 242B in place with respect to the hub carrier assembly 204.

Continuing with FIG. 2, the upper case 210, the first upper case sidewall 226A may include a rib 230. The rib 230 may extend along at least a portion of an outer surface 231 (shown in FIG. 3) of the upper case 210. Continuing with FIG. 2, the rib structurally reinforces the upper case while allowing the case to achieve a space efficient profile. Further, the upper case 210 may be formed out of a continuous piece of material to further structurally reinforce the case. On the upper case 210 there may be a lip 232, having its origin at the end of the upper case 210 which is distal to a differential (e.g., the differential 114 depicted in FIG. 1). From the distal end of the upper case 210, the lip 232 may proceed downward (in relation to the z-axis). The lip 232 may include a pair of notches having a generally "S" shaped edge on the rear and forward sides of the hub carrier assembly 204. Said notches may be mirrored about the central axis 290. The distal end of the lip 232 may provide structural support to the upper portion (e.g., the upper face) of the upper case, while the notches may reduce weight, as opposed to a top case without notches. In other words, the hub carrier assembly 204 may weigh less as compared to a hub carrier assembly 204 which may extend distally at one level. As such, vehicle's ride quality and handling performance may increase through a reduction in the vehicle's unsprung weight.

Pictured in FIG. 2 is a top strut 268 which may originate towards the distal end of the upper case 210, in relation to the x-axis. The top strut 268 may include an intermediate portion, which may be unconnected to the body of the carrier, but which may join a second end portion of the top strut. Said second portion of the strut may be connected to the body of the carrier via a wall, extending at an angle towards the first end of the support beam 236, in one example. In another example, the attachment strut may be unconnected to the hub carrier. Further, the strut 268 is shown positioned laterally inboard, with regard to the x-axis, from the upper case 210 and the lower case 206, to increase the system's space efficiency.

The top strut 268 may have at its inward-facing side, an attachment interface 270, having several portions distinguished by the angle of their outer circumferential area with relation to a central axis. The first portion may include a roughly cylindrical body, extending downward vertically with respect to the z-axis. The attachment interface may additionally include a slot cut into the outer cylindrical surface. Said slot may include a first tapered portion, which extends radially inward at an angle, towards the central axis of the cylinder, and a second tapered portion, radially expanding away from the central axis of the cylinder. The attachment interface may additionally include a third tapered portion. The attachment interface 270 may include a cylindrical portion, an attachment device 272, arising from the attachment interface 270.

The hub carrier assembly 204 may have an attachment device 274, extending vertically with respect to the z-axis. The attachment device 274 may be positioned at the laterally distal end of the hub carrier assembly 204, above the assembly aperture 216. An attachment device 276, in one example, may be positioned at the laterally distal side of the hub carrier assembly 204, below or offset from the attachment device 274. An attachment device 278 may be positioned at a lateral distance from the attachment device 276, at the laterally proximal end of the hub carrier assembly 204, and vertically offset from the attachment device 276. The attachment devices 272, 274, 276, and 278 may engage with a component (e.g., chassis section) of a vehicle (e.g., vehicle 104 shown in FIG. 1) to secure the hub carrier assembly 204 in place.

Figure 3:
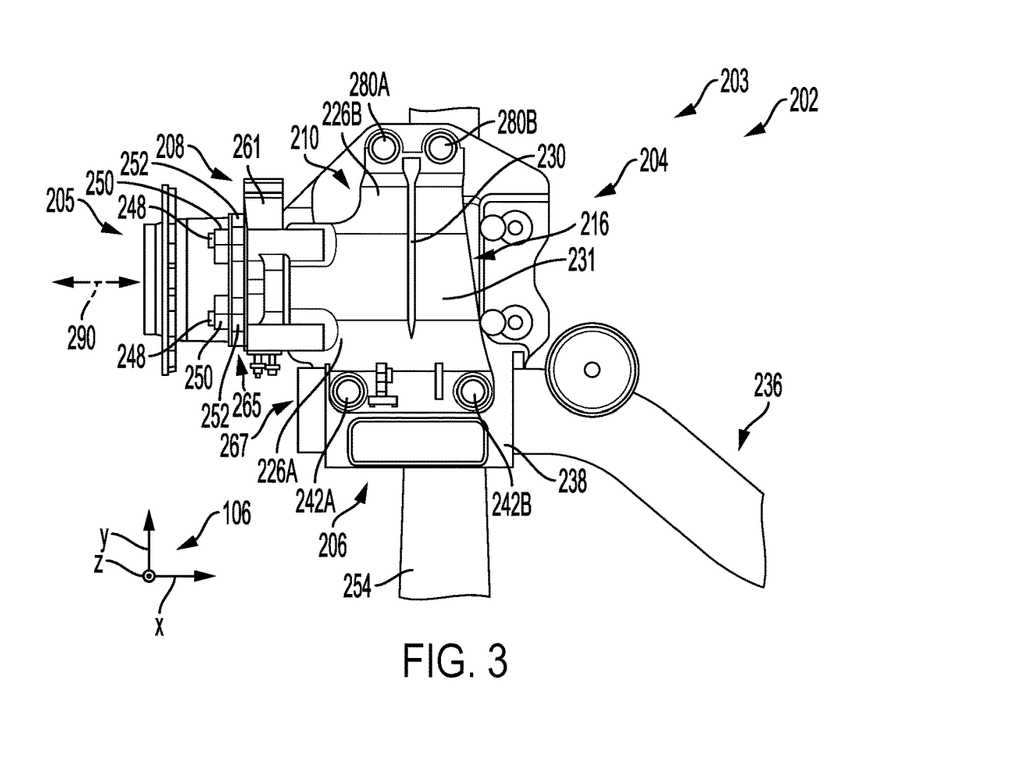
FIG. 3 is a top view of the electric axle assembly, shown in FIG. 2.

FIG. 3 shows the electric axle assembly 202 and the suspension system 203. FIG. 3 further shows the hub carrier assembly 204. Specifically, FIG. 3 depicts the hub carrier assembly 204, spring 254, and support beam 236. The hub carrier 205, the upper case 210, and lower case 206 in the carrier assembly are again depicted. The coupling sleeve 238, which couples the support beam 236 to the hub carrier assembly 204, may be positioned to the rearward side of the hub carrier assembly 204, although other placements are considered.

FIG. 3 shows the rib 230 extending longitudinally along the upper case 210 (e.g., the sidewall 226B of the upper case). Further, in some examples, the rib may extend down sidewall 226A. The rib 230 may be an extension emanating from between a second set of attachment devices 280A, 282B and extending longitudinally towards the first set of attachment devices 242A, 242B. The rib 230 may provide structural support to the hub carrier assembly 204. The rib 230 may enable the carrier assembly's strength to weight ratio to be increased, if so desired. Further, as shown in FIG. 3, the upper case 210 may taper in a longitudinal direction towards the first set of attachment devices 242A, 242B. Specifically, the upper case may taper in a rearward direction, away from the support beam 236. In this way, the system's space efficiency can be increased while also allowing the axle shaft to be more easily inserted through the assembly aperture 216.

The second set attachment devices 280A, 280B may be positioned on the lower portion of the upper case 210 adjacent to sidewall 226B. These attachment devices 280A, 280B may secure the lower case 206 to the upper case 210. The second set of attachment devices 280A, 280B may be screws, bolts, or other appropriate fasteners. Each member of the second set of attachment devices 280A, 280B, may engage with one of the attachment sleeves 282A, 282B, located on the upper case 210. The second set of attachment devices 280A, 280B may be positioned laterally between the attachment devices 242A, 242B which provides a more compact mounting structure arrangement and may simplify axle shaft installation procedures, in some scenarios.

In FIG. 3, the position of the first and second sets of attachment devices 242A, 242B and 280A, 280B, respectively, may be seen. Each of the first and second sets of attachment devices 242A, 242B and 280A, 280B may be separated from each other by a distance along both the z and y axes.

FIG. 3 again shows the mounting flange 208 and the mounting flange bores 261. The bores 250, 252, receiving the attachment devices 248 which allows the hub carrier 205 to removably couple to the mounting flange 208, are further illustrated in FIG. 3. Further, as shown in FIG. 3, the mounting flange 208 may have a forward end 265 that is positioned rearward (in relation to the y-axis) of a lateral end 267 of the support beam 236.

FIG. 4 shows a top view of the electric axle assembly 202 with the hub carrier assembly 204, the support beam 236, and the spring 254. The hub carrier assembly 204 may be held securely around the support beam 236 by the engagement of the lower case 206 and the upper case 210. Inserted into the second set of attachment sleeves 282A, 282B may be a second set of attachment devices 280A, 280B. The first set of attachment devices 280A, 280B may be screws, bolts, or other appropriate fasteners. The second set of attachment sleeves 282A, 282B may include openings profiled to receive the attachment devices. The second set of attachment sleeves 282A, 282B may extend vertically upward along the z-axis, and may be arranged on a shelf 284, shown in FIG. 5, which extends longitudinally outward from the upper case sidewall 226B of the upper case 210. The upper case sidewall 226A is again shown in FIG. 4. The attachment devices 280A, 280B and the attachment devices 242A, 242B may have varying vertical heights which may enable the installation procedure for the axle shaft to be simplified.

Continuing with FIG. 4, the upper case sidewall 226B of the hub carrier assembly 204 may be positioned to the rear of the second set of attachment sleeves 282A, 282B such that the middle portion of the upper case sidewall 226B may not extend past the attachment sleeves 282A, 282B. In this way, the second set of attachment sleeves 282A, 282B may secure the second set of attachment devices 280A, 280B in place with respect to the hub carrier assembly 204. However, the hub carrier assembly 204 may weigh less than if there were a continuous face extending on either side (e.g., the proximal and distal sides) of the first set of attachment sleeves 244A, 244B. Said weight reduction may facilitate gains in vehicle handling performance.

The sets of attachment devices 242A, 242B, 280A, and 280B may be positioned vertically offset from each other so as to save space and allow for more efficient packaging of the hub carrier assembly 204. In other words, the first set attachment devices 242A, 242B may be positioned vertically higher with respect to the z-axis than the second set of attachment devices 280A, 280B. Compared to designs in which the second set of attachment devices 280A, 280B is on the same lateral plane (at the same height) as the first set of attachment devices 242A, 242B, the illustrated embodiment may ease in the installation of the axle shaft in the assembly aperture 216, shown in FIG. 5. In other words, the hub carrier assembly 204 may take up less space, use less material to form, and may weigh less compared to larger designs, and may allow for other components to be moved inwards, if desired.

The spring attachment component 214 may include the pair of brackets 256A, 256B. The first bracket 256A may include two vertically extending portions. The first vertically extending portion may be placed towards the distal end of the hub carrier (e.g., laterally away from the differential), while the proximal vertically extending portion may be placed towards the proximal end of the hub carrier (e.g., laterally towards the differential). The first bracket 256A may extend around at least a portion of the spring 254. The first bracket 256A may be reinforced by the support member 258A, which may be placed at the intersection of the distal vertically extending portion and the hub carrier assembly 204. The support member 258B may be placed at the proximal intersection of the first bracket 256A and the hub carrier assembly 204. The hub carrier 205 is shown positioned vertically above the brackets 256A, 256B. The opening 218 in the hub carrier 205 is further illustrated in FIG. 4.

As previously discussed, the second set of attachment devices 280A, 280B may be positioned lower on the z-axis than first set of attachment devices 242A, 242B, and the second set of attachment devices may be inserted into the second set of attachment sleeves 282A, 282B. This variation in the height of the attachment devices may enable a greater portion of the aperture 216, shown in FIG. 5, to be exposed when the upper case 210 is removed during axle shaft installation. In this way, axle shaft installation may be simplified. The attachment devices 264 in the mounting flange 208 are again illustrated in FIG. 4.

Figure 5:
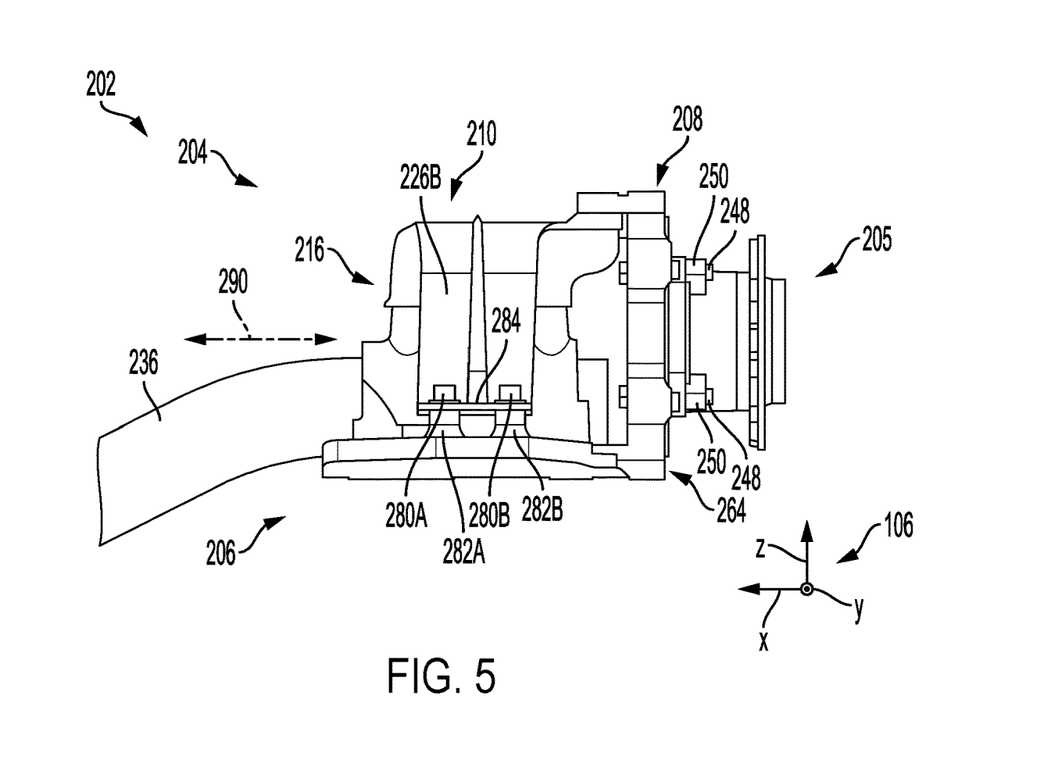
FIG. 5 is a rear view of the electric axle assembly, shown in FIG. 2.

FIG. 5 depicts a rear view of the electric axle assembly 202 with the hub carrier assembly 204. Further, the hub carrier 205, the upper case 210, the lower case 206, and the support beam 236 are again illustrated. FIG. 5 further depicts each member of the second set of attachment devices 280A, 280B, and their associated attachment sleeves 282A, 282B, separated by a distance along the x-axis. The attachment devices 280A, 280B allow the upper case 210 to be attached to the lower case 206 with the aperture 216 formed therebetween.

The sidewall 226B of the upper case 210 is illustrated in FIG. 5 along with the mounting flange 208. Attachment devices 264 couple the mounting flange 208 to the lower case 206. The carrier bores 250 and the attachment devices 248 attaching the mounting flange 208 to the hub carrier 205 are further illustrated in FIG. 5.

Although FIGS. 2-5 depicts one hub carrier assembly, there may be a second hub carrier assembly in the axle system, in some embodiments. The second hub carrier may include the components which may be identical to or mirror images of the components in the hub carrier assembly 204 as depicted in FIGS. 2-5.

FIGS. 1-5 show example configurations with relative positioning of the various components. If shown directly contacting each other, or directly coupled, then such elements may be referred to as directly contacting or directly coupled, respectively, at least in one example. Similarly, elements shown adjacent or contiguous to each other may be adjacent or contiguous to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown below/above one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" may be construed to mean plus or minus five percent or less of the range or value unless otherwise specified.

The invention will be further described in the following paragraphs. In one aspect, a suspension system is provided that includes a hub carrier designed to couple to a wheel hub; and a hub carrier mounting structure including: a mounting flange removably attached to the hub carrier; and an upper case and a lower case coupled to a support beam; wherein the upper and lower cases are coupled via a first set of attachment devices and a second set of attachment devices that are positioned on opposing sides of the upper and lower cases; and wherein the first and second set of attachment devices have varying vertical heights.

In another aspect, a de Dion suspension system is provided that includes a de Dion beam extending between a first hub carrier assembly and a second hub carrier assembly; wherein the first hub carrier assembly includes: a hub carrier designed to couple to a wheel hub; and a hub carrier mounting structure including: a mounting flange removably attached to the hub carrier; and an upper case and a lower case coupled to a support beam; wherein the upper and lower cases are coupled via a first set of attachment devices and a second set of attachment devices positioned on opposing sides of the upper and lower cases; and wherein upper case includes opposing sidewalls having varying vertical heights.

In yet another aspect, a vehicle suspension system is provided that includes a hub carrier designed to couple to a wheel hub; and a hub carrier mounting structure including: a mounting flange removably attached to the hub carrier; and an upper case and a lower case removably coupled one another and a de Dion beam, wherein the upper case and the lower case for an aperture that is designed to receive an axle shaft; wherein the upper and lower cases are coupled via a first set of attachment devices and a second set of attachment devices that are positioned on opposing sides of the upper and lower cases; and wherein the first and second set of attachment devices have varying vertical heights.

In any of the aspects or combinations of the aspects, the first set of attachment devices may be positioned laterally inboard from the second set of attachment devices.

In any of the aspects or combinations of the aspects, the mounting flange may include a forward end arranged longitudinally rearward from a lateral end of the support beam.

In any of the aspects or combinations of the aspects, the upper case may include a sidewall extending below an aperture designed to receive an axle shaft.

In any of the aspects or combinations of the aspects, the suspension system may further include a leaf spring coupled to the hub carrier mounting structure.

In any of the aspects or combinations of the aspects, the leaf spring may extend under the support beam.

In any of the aspects or combinations of the aspects, the support beam may be a de Dion beam.

In any of the aspects or combinations of the aspects, the suspension system may further include a differential rotationally coupled to an electric machine and an axle shaft rotatably coupled to a drive wheel, wherein the drive wheel is mounted on the wheel hub.

In any of the aspects or combinations of the aspects, the first and second sets of attachment devices may have varying vertical heights and the first set of attachment devices may be positioned laterally inboard from the second set of attachment devices.

In any of the aspects or combinations of the aspects, the system may further include a spring extending vertically under the de Dion beam.

In any of the aspects or combinations of the aspects, the system may further include a differential rotationally coupled to an electric machine and an axle shaft rotatably coupled to a drive wheel, wherein the drive wheel may be mounted on the wheel hub.

In any of the aspects or combinations of the aspects, the system may further include a strut positioned laterally inboard from the upper case and the lower case.

In any of the aspects or combinations of the aspects, the system may further include a spring attachment component that is positioned below the lower case and is profiled to attach to a leaf spring.

In any of the aspects or combinations of the aspects, the first set of attachment devices may be positioned vertically above the de Dion Beam.

In any of the aspects or combinations of the aspects, the upper case may include a rib extending longitudinally across at least a portion of its outer surface.

In any of the aspects or combinations of the aspects, the upper case may taper in a longitudinal direction towards the first set of attachment devices.

In any of the aspects or combinations of the aspects, the upper case may be formed out of a continuous piece of material.

In any of the aspects or combinations of the aspects, the upper case may taper in a rearward direction and the second set of attachment devices is positioned laterally between the first set of attachment devices.

In another representation, a de Dion beam suspension assembly is provided that includes a de Dion beam that is clamped via an upper case that is removably attached to a lower case via two sets of attachment devices with varying vertical positions and wherein the upper case and the lower case form an aperture that is profiled to receive an axle shaft and wherein one of the two sets of attachment devices is positioned vertically above the de Dion beam.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. For example, the above technology can be applied to axle assemblies that include different types of propulsion sources including different types of electric machines and/or combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A suspension system, comprising:
a hub carrier designed to couple to a wheel hub; and
a hub carrier mounting structure including:
  a mounting flange removably attached to the hub carrier; and
  an upper case and a lower case coupled to a support beam;
wherein the upper and lower cases are coupled via a first set of attachment devices and a second set of attachment devices that are positioned on opposing sides of the upper and lower cases;
wherein the first and second set of attachment devices have varying vertical heights; and
wherein the first set of attachment devices is positioned laterally inboard from the second set of attachment devices.

2. The suspension system of claim 1, wherein the second set of attachment devices is positioned laterally between the first set of attachment devices.

3. The suspension system of claim 1, wherein the mounting flange includes a forward end arranged longitudinally rearward from a lateral end of the support beam.

4. The suspension system of claim 1, wherein the upper case includes a sidewall extending below an aperture designed to receive an axle shaft.

5. The suspension system of claim 1, further comprising a leaf spring coupled to the hub carrier mounting structure.

6. The suspension system of claim 5, wherein the leaf spring extends under the support beam.

7. The suspension system of claim 1, wherein the support beam is a de Dion beam.

8. The suspension system of claim 1, further comprising a differential rotationally coupled to an electric machine and an axle shaft rotatably coupled to a wheel assembly.

9. A de Dion suspension system, comprising:
a de Dion beam extending between a first hub carrier assembly and a second hub carrier assembly;
wherein the first hub carrier assembly comprises:
  a hub carrier designed to couple to a wheel hub; and
  a hub carrier mounting structure including:
    a mounting flange removably attached to the hub carrier; and
    an upper case and a lower case coupled to a support beam;
wherein the upper and lower cases are coupled via a first set of attachment devices and a second set of attachment devices positioned on opposing sides of the upper and lower cases;
wherein the upper case includes opposing sidewalls having varying vertical heights; and
wherein the first and second sets of attachment devices have varying vertical heights and wherein the first set of attachment devices is positioned laterally inboard from the second set of attachment devices.

10. The de Dion suspension system of claim 9, further comprising a spring extending vertically under the de Dion beam.

11. The de Dion suspension system of claim 9, further comprising a differential rotationally coupled to an electric machine and an axle shaft rotatably coupled to a wheel assembly.

12. The de Dion suspension system of claim 9, further comprising a strut positioned laterally inboard from the upper case and the lower case.

13. The de Dion suspension system of claim 9, further comprising a spring attachment component that is positioned below the lower case and is profiled to attach to a leaf spring.

14. A vehicle suspension system, comprising:
- a hub carrier designed to couple to a wheel hub; and
- a hub carrier mounting structure including:
  - a mounting flange removably attached to the hub carrier; and
  - an upper case and a lower case removably coupled one another and a de Dion beam, wherein the upper case and the lower case form an aperture that is designed to receive an axle shaft;
- wherein the upper and lower cases are coupled via a first set of attachment devices and a second set of attachment devices that are positioned on opposing sides of the upper and lower cases;
- wherein the first and second sets of attachment devices have varying vertical heights; and
- wherein the upper case tapers in a rearward direction and the second set of attachment devices is positioned laterally between the first set of attachment devices.

15. The vehicle suspension system of claim 14, wherein the first set of attachment devices is positioned vertically above the de Dion beam.

16. The vehicle suspension system of claim 14, wherein the upper case includes a rib that extends longitudinally across at least a portion of its outer surface.

17. The vehicle suspension system of claim 14, wherein the upper case tapers in a longitudinal direction towards the first set of attachment devices.

18. The vehicle suspension system of claim 14, wherein the upper case is formed out of a continuous piece of material.

* * * * *